US012607251B2

(12) United States Patent (10) Patent No.: US 12,607,251 B2

Schwarz et al. (45) Date of Patent: Apr. 21, 2026

(54) TRANSMISSION ASSEMBLY AND BRAKE BOOSTER

(71) Applicant: ZF Active Safety GmbH, Koblenz (DE)

(72) Inventors: Daniel Schwarz, Koblenz (DE); Hans-Martin Giese, Polch (DE)

(73) Assignee: ZF Active Safety GmbH, Koblenz (DE)

( * ) Notice: Subject to any disclaimer, the term of this patent is extended or adjusted under 35 U.S.C. 154(b) by 376 days.

(21) Appl. No.: 17/884,731

(22) Filed: Aug. 10, 2022

(65) Prior Publication Data

US 2023/0059645 A1 Feb. 23, 2023

(30) Foreign Application Priority Data

Aug. 20, 2021 (DE) ............................ 102021121702

(51) Int. Cl.
| | |
|---|---|
| *F16H 19/04* | (2006.01) |
| *B60T 8/44* | (2006.01) |
| *B60T 13/74* | (2006.01) |
| *F04B 17/03* | (2006.01) |
| *F16D 3/12* | (2006.01) |

(52) U.S. Cl.
CPC ................ *F16H 19/04* (2013.01); *B60T 8/44* (2013.01); *B60T 13/745* (2013.01); *F04B 17/03* (2013.01); *F16D 3/12* (2013.01)

(58) Field of Classification Search
CPC .... F16H 55/12; F16H 55/14; F16H 2019/046; F16H 19/04; B60T 13/745
See application file for complete search history.

(56) References Cited

U.S. PATENT DOCUMENTS

2016/0082940 A1* 3/2016 Cagnac ................ B60T 13/745
303/15

FOREIGN PATENT DOCUMENTS

| | | | | | |
|---|---|---|---|---|---|
| DE | 102013204199 A1 | * | 9/2014 | ............... | F16D 3/12 |
| DE | 102017106699 A1 | * | 10/2018 | | |
| WO | 2014177691 A1 | | 11/2014 | | |
| WO | 2017046380 A1 | | 3/2017 | | |

* cited by examiner

*Primary Examiner* — Gregory Robert Weber

(74) *Attorney, Agent, or Firm* — Kristin L. Murphy

(57) ABSTRACT

A transmission assembly for a brake booster of a vehicle is disclosed. The transmission assembly comprises a rack module having a base section and at least one tooth row section; and at least one transmission arrangement for transmitting a moment, such as a torque. The at least one transmission arrangement is in engagement with the at least one tooth row section of the rack module and has a shaft, a screw wheel carried by the shaft and a cylindrical wheel. The at least one transmission arrangement has at least one relief element, which is arranged effectively in a load path of the at least one transmission arrangement, and brake booster for a vehicle that comprises an electric motor, a push rod and a transmission assembly, which acts between the electric motor and the push rod.

18 Claims, 2 Drawing Sheets

TRANSMISSION ASSEMBLY AND BRAKE BOOSTER

CROSS-REFERENCE TO RELATED APPLICATION

This application claims priority to German Patent Application No. 102021121702.4, filed Aug. 20, 2021, the disclosure of which is incorporated herein by reference in its entirety.

TECHNICAL FIELD

The disclosure relates to a transmission assembly for a brake booster of a vehicle. The disclosure furthermore relates to a brake booster, in particular an electromechanical brake booster, for a vehicle.

BACKGROUND

Vehicle brake systems often have electromechanical brake boosters (electronic brake boosters, EBB, EBB actuators), in which the energy is produced electrically by an electric motor and is transmitted by a transmission. WO 2014/177691 A1, for example, discloses a brake system having a master cylinder and an electric servo brake with transmission of the movement of the electric motor to a push rod of the master cylinder by two mechanisms, which are symmetrical with respect to the axis of the system, for transmitting the movement of the electric motor to two toothed racks of a body of the electric servo brake.

In known systems, the rigidity of the transmission system is asymmetrical due to the indirect and direct load paths. This leads to step changes in the stiffness in the load path and thus to high stresses, which impair the contact pattern of the gear wheels of the transmission. The consequence may be a different load distribution to the rack module, an offset in the gear wheel contact or an offset of the axial load of the rack module. This leads to higher loading of the components and to a shorter service life. The consequence may be a failure of the electromechanical brake booster and thus of the brake system.

SUMMARY

What is needed is to structurally and/or functionally improve a transmission assembly mentioned at the outset. Furthermore, what is needed is to structurally and/or functionally improve a brake booster mentioned at the outset.

The object is achieved by means of a transmission assembly having the features of claim 1. In addition, the object is achieved by means of a brake booster having the features of claim 10. Advantageous embodiments and/or developments form the subject matter of the dependent claims.

A transmission assembly can be for a brake booster. The brake booster can be for a vehicle. The brake booster can be an electromechanical brake booster. The vehicle can be a motor vehicle. The motor vehicle can be a passenger car or a heavy goods vehicle.

The transmission assembly can comprise a rack module. The rack module can have a base section. The rack module can have at least one tooth row section.

The rack module can have and/or define a longitudinal axis. The base section of the rack module can have and/or define a longitudinal axis. The at least one tooth row section of the rack module can have and/or define a longitudinal axis. The rack module and/or its base section can have a sleeve-like or cylindrical shape. The rack module and/or its base section can have a recess extending along the longitudinal axis. The rack module and/or its base section can have an annular cross section. The rack module and/or its base section can have an inner side and an outer side in the radial direction. The rack module and/or its base section can have longitudinal guides. The longitudinal guides can be arranged on the inside. The at least one tooth row section can be arranged on the outside. The rack module can have a single tooth row section. The rack module can be embodied as a single rack module. The rack module can have a first tooth row section and a second tooth row section. The first tooth row section and the second tooth row section can be arranged diametrically opposite one another, for example in relation to the longitudinal axis. The rack module can be embodied as a double rack module. In engagement with at least one gear wheel, the rack module can serve to form a rack-and-pinion drive.

The at least one tooth row section can have drive teeth. The drive teeth can have involute toothing, straight toothing or helical toothing. The at least one tooth row section can have a plate-like shape. The at least one tooth row section can have a front side and a rear side. The drive teeth can be arranged on the front side. The at least one tooth row section can have profiling for connection to the base section. The profiling can be arranged on the rear side. The profiling can be tooth-like. The teeth of the profiling can be aligned at least approximately parallel to the drive teeth. The teeth of the profiling can have an asymmetrical profile. The teeth of the profiling and/or the drive teeth can be aligned at least approximately at right angles to the longitudinal axis.

The transmission assembly can have at least one transmission arrangement. The at least one transmission arrangement can be used and/or designed to transmit a moment, such as a torque, and/or a force.

The at least one transmission arrangement can be in engagement with the at least one tooth row section of the rack module. The transmission assembly can have two transmission arrangements, for example a first transmission arrangement and a second transmission arrangement. The two transmission arrangements can each be in engagement with a tooth row section of the rack module. For example, the first transmission arrangement can be in engagement with the first tooth row section of the rack module and the second transmission arrangement can be in engagement with the second tooth row section of the rack module.

The at least one transmission arrangement can have a shaft. The at least one transmission arrangement can have a screw wheel, such as a screw gear wheel. The screw wheel can be supported by the shaft and/or arranged on the shaft and/or connected, for example connected for conjoint rotation, to the shaft. The screw wheel can be fitted onto the shaft. The screw wheel can be formed integrally with the shaft, i.e. the shaft and the screw wheel can be produced from one part. The at least one transmission arrangement can have a cylindrical wheel, such as a cylindrical gear wheel. The cylindrical wheel can be arranged on the shaft and/or connected, for example connected for conjoint rotation, to the shaft. The cylindrical wheel can be fitted onto the shaft. The cylindrical wheel can be arranged at one side, e.g. one end, of the shaft. The cylindrical wheel and the screw wheel can be arranged opposite one another. The cylindrical wheel and the screw wheel can be arranged opposite one another in relation to the longitudinal axis and/or axis of rotation of the shaft, for example in the direction of the longitudinal axis and/or axis of rotation of the shaft. The screw wheel can extend along the longitudinal axis and/or axis of rotation of the shaft. The cylindrical wheel and the screw wheel can be arranged adjacent to one another, for example directly next to one another.

The at least one transmission arrangement can be in engagement by means of its screw wheel with the at least one tooth row section of the rack module. The screw wheel can be in engagement with the at least one tooth row section of the rack module. The teeth of the screw wheel and the teeth of the at least one tooth row section can engage effectively in one another, in order, for example, to transmit a moment, such as a torque, and/or a force from the at least one transmission arrangement to the rack module. The rack module can be moved along the longitudinal axis of the rack module by the at least one transmission arrangement. The at least one transmission arrangement and the rack module can be designed and/or can interact in such a way that a moment, such as a torque, for example of an electric motor, is converted into a movement, such as linear movement, of the rack module.

The at least one transmission arrangement can have at least one relief element. The at least one relief element can be arranged effectively in a load path of the at least one transmission arrangement. The load path can be a path of the moment, such as a torque, to be transmitted and/or of the force, for example through the individual components of the at least one transmission arrangement. The load path can be a path which the moment, such as a torque, and/or the force takes through at least one transmission arrangement.

The at least one relief element can be designed to compensate for stiffnesses, e.g. different stiffnesses, in the load path. The at least one relief element can be designed to compensate for a gear wheel offset. The gear wheel offset can be an offset of the tooth contacts. The gear wheel offset can be a backlash of gear wheels and/or a backlash of the at least one transmission arrangement and/or a backlash between the two transmission arrangements. The at least one relief element can be designed to compensate for a backlash difference. The backlash difference can be a backlash difference between the two transmission arrangements.

The at least one relief element can be a damping element. The damping element can have a high stiffness in relation to axial forces and/or radial forces and/or torsional moments. The damping element can have a relatively low stiffness in relation to axial forces and/or radial forces and/or torsional moments. The damping element can be designed to absorb kinetic energy, e.g. that of an occurring vibration or the like, and/or to convert it into potential energy, for example by section-wise reversible or irreversible deformation of the damping element.

Unless otherwise specified, or unless the context otherwise requires, the indications "axial" and "radial" may refer to a direction of extent of the axis, such as the axis of rotation, of the shaft of the at least one transmission arrangement. "Axial" then corresponds to a direction of extent of the axis, such as the axis of rotation. "Radial" is then a direction which is perpendicular to the direction of extent of the axis, such as the axis of rotation, and intersects with the axis, such as the axis of rotation.

The at least one relief element can be produced from rubber. The at least one relief element can be produced from a, in particular soft, plastic. The at least one relief element may be elastically and/or plastically deformable. The at least one relief element can be reversibly or irreversibly deformable.

The at least one relief element can be arranged effectively between the cylindrical wheel and the shaft of the at least one transmission arrangement. The at least one relief element can be arranged radially between the cylindrical wheel and the shaft of the at least one transmission arrangement. The cylindrical wheel of the at least one transmission arrangement can have a main body. The cylindrical wheel of the at least one transmission arrangement can have a gear wheel section. The gear wheel section can be arranged on the main body and/or connected, for example connected for conjoint rotation, to said body. The gear wheel section can be arranged radially on the outside. The gear wheel section can form the radially outer circumference of the cylindrical wheel. The cylindrical wheel and/or its gear wheel section can be in engagement with and/or driven by an electric motor, for example via one or more gear wheels and/or shafts. The main body can be arranged radially on the inside. The main body can be arranged, e.g. fitted, on the shaft of the at least one transmission arrangement. The main body can be connected, for example connected for conjoint rotation, to the shaft. The main body can be the at least one relief element and/or can be designed in this way.

A brake booster can be for a vehicle. The brake booster can be an electromechanical brake booster. The vehicle can be a motor vehicle. The motor vehicle can be a passenger car or a heavy goods vehicle. The brake booster can have an electric motor. The brake booster can have a push rod. The brake booster can have a transmission assembly. The transmission assembly can be arranged effectively between the electric motor and the push rod. The transmission assembly can be designed as described above and/or below.

The brake booster can enable electrically controlled intervention in a brake actuation and/or can be designed for this purpose. The brake booster can be used and/or designed to boost a brake pedal force. The brake booster can act in the direction of a brake pedal force. The brake booster can be used and/or designed to actuate a brake independently of a brake pedal force. The brake booster can be used and/or designed to attenuate a brake pedal force. The brake booster can act counter to a brake pedal force. The brake booster can be used and/or designed to simulate a brake pedal force. The brake booster can be used and/or designed to actuate a brake in an automated or partially automated manner. The brake booster can allow purely mechanical actuation of a brake by a brake pedal.

The vehicle, such as a motor vehicle, can have at least one engine for a travel drive. The vehicle can have at least one drivable vehicle wheel. The vehicle can have at least one braking device. The at least one braking device can be used and/or designed to brake at least one vehicle wheel. The at least one braking device can be a parking brake device. The at least one braking device can be a service brake device. The at least one braking device can be a dual-circuit or multi-circuit braking device. The at least one braking device can be a hydraulic braking device. The at least one braking device can have a brake master cylinder. The at least one braking device can have the brake booster. The at least one braking device can have a brake pedal, a brake fluid reservoir, a brake pressure distributor, a pipe system, brake hoses, wheel brake cylinders and/or bleed valves.

The brake master cylinder can have a cylinder longitudinal axis. The brake booster can be used for arrangement on the brake master cylinder and/or can be designed in such a way. The longitudinal axis of the rack module or its base section and/or its at least one tooth row section can be arranged or can be capable of being arranged coaxially with the cylinder longitudinal axis. The longitudinal axis of the rack module or its base section and/or its at least one tooth row section can be arranged or can be capable of being arranged coaxially with the cylinder longitudinal axis in an installed position of the brake booster.

The electric motor can be a DC motor. The electric motor can be a brushless DC motor. The electric motor can be an electronically commutated brushless DC motor. The electric motor can be a synchronous motor. The electric motor can be monitored with the aid of an electric monitoring device. The electric monitoring device can be a control unit and/or a control device. The electric monitoring device can have a processor device. The electric monitoring device can have a storage device. The electric monitoring device can have at least one signal input. The electric monitoring device can have at least one signal output.

The transmission assembly can be used and/or designed to convert a rotational movement into a linear movement. The push rod can have a push rod longitudinal axis. The push rod longitudinal axis and the longitudinal axis of the rack module or its base section and/or its at least one tooth row section can be arranged coaxially with one another. The rack module can be firmly connected to the push rod in order to transmit mechanical power in the direction of extent of the longitudinal axis or of the push rod longitudinal axis so as to enable brake actuation by means of the electric motor. A connection between the rack module and the push rod can be releasable in order to enable brake actuation independent of the electric motor.

With the disclosure, a mechanical load-bearing capacity can be improved. Operating behaviour at different and/or changing load levels and/or load behaviour and/or load distribution can be improved. Step changes in stiffness can be avoided. The contact pattern can be improved. Better load distribution can be made possible. Robustness can be increased. Tolerances can be compensated. The durability and/or service life, of the gears for example, can be increased. The pedal feel can be improved. Operational safety can be increased and/or fail safety can be improved.

BRIEF DESCRIPTION OF DRAWINGS

Exemplary arrangements of the disclosure are described in greater detail below with reference to figures, which are schematic and illustrative and of which.

DETAILED DESCRIPTION

Figure 1:
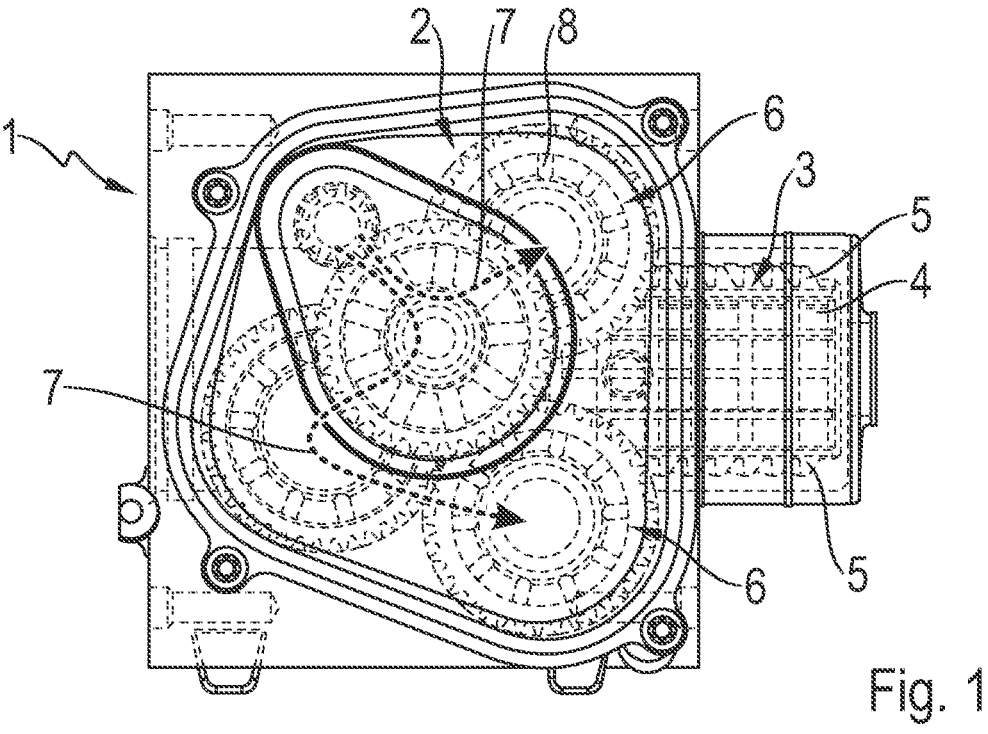
FIG. 1 shows a brake booster having a transmission assembly with load paths.

FIG. 1 shows schematically an electromechanical brake booster 1 for a motor vehicle. The brake booster 1 comprises an electric motor, a push rod and a transmission assembly 2 which is effective between the electric motor and the push rod. The gear assembly 2 is designed to convert a rotational movement generated by the electric motor into a linear movement of the push rod.

The transmission assembly 2 has a rack module 3 having a base section 4 and at least one tooth row section 5. In the exemplary arrangement under consideration, the rack module 3 has two tooth row sections 5 arranged on the base section 4.

The transmission assembly 2 furthermore has at least one transmission arrangement 6. The at least one transmission arrangement 6 is designed to transmit a moment, such as a torque. In the exemplary arrangement under consideration, the transmission assembly 2 has two transmission arrangements 6, each of which is in engagement with a tooth row section 5 of the rack module 3.

The transmission assembly 2 has and/or defines at least one or more load paths 7 (illustrated by the arrows in FIG. 1). At least one transmission arrangement 6 has at least one relief element 8 which is arranged effectively in a load path 7 of the at least one transmission arrangement 6.

Figure 2:
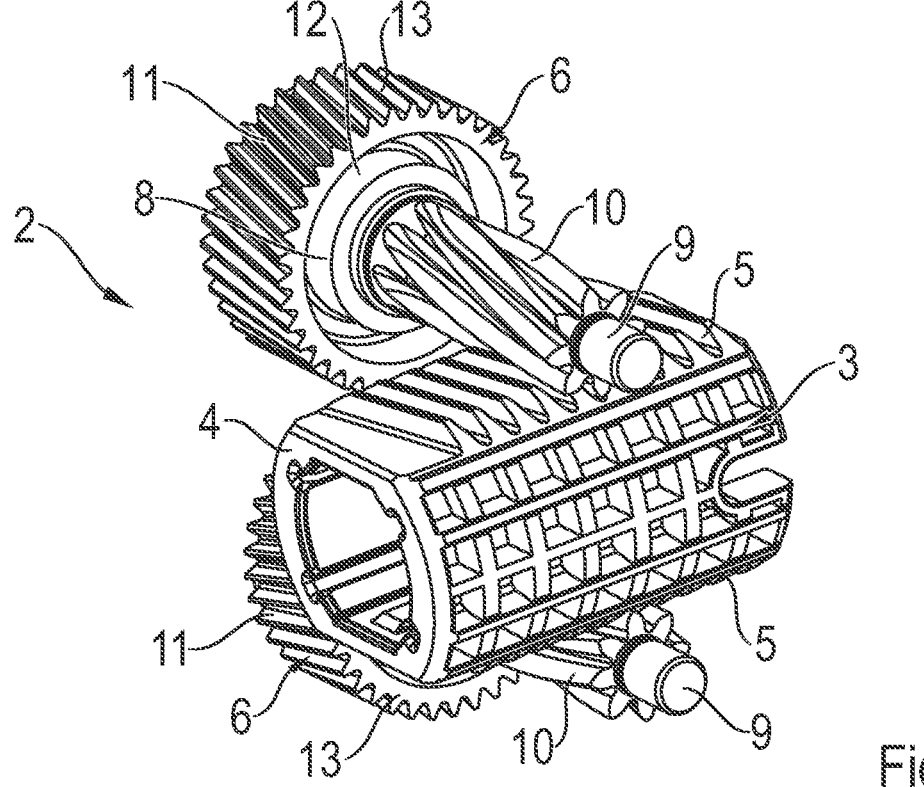
FIG. 2 shows a detail of the transmission assembly.

FIG. 2 shows in detail a segment of the transmission assembly 2 according to FIG. 1.

The two transmission arrangements 6 of the transmission assembly 2 are in engagement with the tooth row sections 5 of the rack module 3. The tooth row sections 5 are arranged diametrically opposite one another in relation to the longitudinal axis of the base section 4, wherein a first transmission arrangement 6 is in engagement with a first tooth row section 5 of the rack module 3 and a second transmission arrangement 6 is in engagement with a second tooth row section 5 of the rack module 3.

Each transmission arrangement 6 has a shaft 9, a screw wheel 10 carried by the shaft 9, and a cylindrical wheel 11. The screw wheels 10 engage effectively in toothing of the tooth row section 5 of the rack module 3.

The at least one relief element 8 is designed to compensate for different stiffnesses in the load path 7 and/or to compensate for a gear wheel offset. The at least one relief element 8 can be a damping element which has a high or relatively low rigidity in relation to axial and/or radial forces and/or torsional moments. The at least one relief element 8 can be produced from rubber or a, in particular soft, plastic, and can be elastically and/or plastically deformable.

The at least one relief element 8 is arranged effectively between the cylindrical wheel 11 and the shaft 9 of at least one transmission arrangement 6. The cylindrical wheel 11 is designed as a gear wheel and has a radially inner main body 12 and a radially outer gear wheel section 13 concentric with the shaft 9. The gear wheel section 13 is designed in such a way that it is in engagement with an electric motor and is driven by the latter, for example via one or more gear wheels and/or shafts. The main body 12 is fitted onto the shaft 9 of the transmission arrangement 6 and is connected to the shaft 9 for conjoint rotation therewith. The main body 12 is the relief element 8 or is designed as a relief element 8.

In other respects, reference is additionally made, in particular, to FIG. 1 and the associated description.

Figure 3:
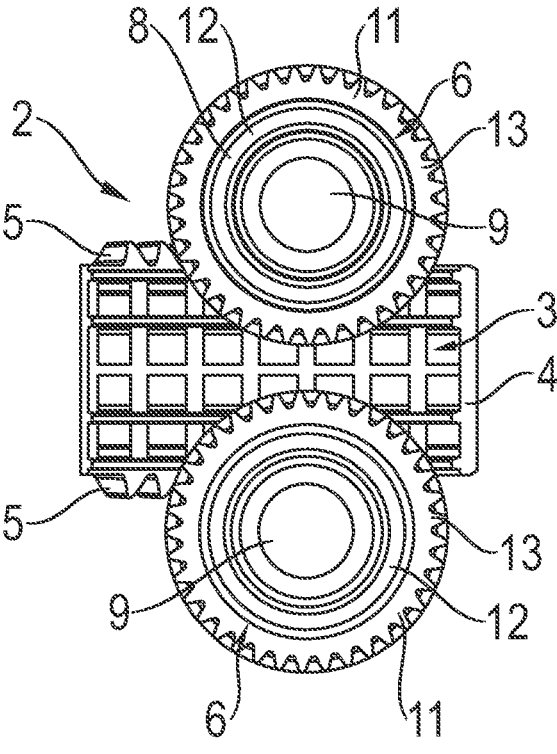
FIG. 3 shows a variant of the transmission assembly.

FIG. 3 shows a variant of the transmission assembly 2 which has only a single relief element 8.

According to this variant, only the main body 12 of the cylindrical wheel 11 of the transmission arrangement 6, illustrated at the top in FIG. 3, is designed as a relief element 8. The cylindrical wheel 11 illustrated at the bottom in FIG. 3 has a conventional main body 12.

In other respects, reference is additionally made, in particular, to FIGS. 1 and 2 and the associated description.

Figure 4:
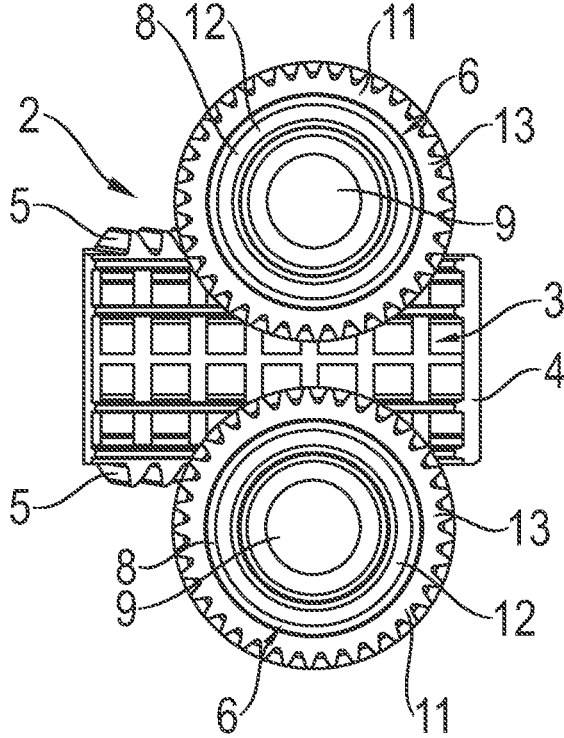
FIG. 4 shows a further variant of the transmission assembly.

FIG. 4 shows a further variant of the transmission assembly 2, which has two relief elements 8.

According to this variant, the main bodies 12 of the cylindrical wheels 11 of the two transmission arrangements 6 are each designed as a relief element 8.

In other respects, reference is additionally made, in particular, to FIGS. 1 to 3 and the associated description.

In particular, "can" denotes optional features of the disclosure. Accordingly, there are also developments and/or exemplary arrangements of the disclosure that have the respective feature or features in addition or as an alternative.

If required, isolated features can also be selected from the combinations of features disclosed here and, breaking up a structural and/or functional relationship which may exist between said features, can be used in combination with other features to delimit the subject matter of a claim.

The invention claimed is:

1. A transmission assembly for a brake booster of a vehicle, comprising:

a rack module having a base section and at least one tooth row section; and at least one transmission arrangement for transmitting a moment, wherein the at least one transmission arrangement is in engagement with the at least one tooth row section of the rack module and has a shaft, a screw wheel carried by the shaft, a cylindrical wheel, and at least one relief element integrally formed with the cylindrical wheel and disposed solely on an axial side of the cylindrical wheel facing the screw wheel, wherein the at least one relief element is radially inset within an inner periphery of the cylindrical wheel.

2. The transmission assembly according to claim 1, wherein the at least one relief element is designed to compensate for a gear wheel offset.

3. The transmission assembly according to claim 2, wherein the at least one relief element is a damping element.

4. The transmission assembly according to claim 2, wherein the at least one relief element is arranged effectively between the cylindrical wheel and the shaft of the at least one transmission arrangement.

5. The transmission assembly according to claim 2, wherein the cylindrical wheel of the at least one transmission arrangement has a main body and a gear wheel section, wherein the main body is designed as the at least one relief element.

6. The transmission assembly according to claim 2, wherein the rack module has two tooth row sections, and two transmission arrangements are provided, each of which, with its screw wheel, is in engagement with a tooth row section of the rack module.

7. The transmission assembly according to claim 1, wherein the at least one relief element is a damping element.

8. The transmission assembly according to claim 7, wherein the at least one relief element is designed to compensate for a gear wheel offset.

9. The transmission assembly according to claim 7, wherein the at least one relief element is produced from rubber or a material that may be elastically and/or plastically deformable.

10. The transmission assembly according to claim 1, wherein the at least one relief element is produced from rubber or a material that may be elastically and/or plastically deformable.

11. The transmission assembly according to claim 1, wherein the at least one relief element is elastically and/or plastically deformable.

12. The transmission assembly according to claim 1, wherein the at least one relief element is arranged effectively between the cylindrical wheel and the shaft of the at least one transmission arrangement.

13. The transmission assembly according to claim 1, wherein the cylindrical wheel of the at least one transmission arrangement has a main body and a gear wheel section, wherein the main body is designed as the at least one relief element.

14. The transmission assembly according to claim 1, wherein the rack module has two tooth row sections, and two transmission arrangements are provided, each of which, with its screw wheel, is in engagement with a tooth row section of the rack module.

15. A brake booster for a vehicle, comprising an electric motor, a push rod and a transmission assembly according to claim 1, which is configured to act between the electric motor and the push rod.

16. The transmission assembly according to claim 1, wherein the rack module further comprise at least one longitudinal guide.

17. The transmission assembly according to claim 16, wherein the at least one longitudinal guide is arranged on an inner side of the rack module.

18. The transmission assembly according to claim 1, wherein the screw extends substantially the length of the shaft.

* * * * *